Oct. 13, 1925.

H. M. BIEBEL 1,557,009

ELECTRIC WAFFLE IRON

Filed July 20, 1922

WITNESSES:

INVENTOR
Herman M. Biebel.
BY
ATTORNEY

Patented Oct. 13, 1925.

1,557,009

UNITED STATES PATENT OFFICE.

HERMAN M. BIEBEL, OF OAKMONT, PENNSYLVANIA, ASSIGNOR TO WESTINGHOUSE ELECTRIC & MANUFACTURING COMPANY, A CORPORATION OF PENNSYLVANIA.

ELECTRIC WAFFLE IRON.

Application filed July 20, 1922. Serial No. 576,195.

*To all whom it may concern:*

Be it known that I, HERMAN M. BIEBEL, a citizen of the United States, and a resident of Oakmont, in the county of Allegheny and State of Pennsylvania, have invented a new and useful Improvement in Electric Waffle Irons, of which the following is a specification.

My invention relates to electrically-heated devices and, particularly, to electrically-heated waffle irons.

An object of my invention is to provide a relatively simple and compact construction for an electrically-heated waffle iron.

Another object of my invention is to provide relatively simple means for carrying a waffle iron that shall be effective to vary the angular position of one of the casings relatively to the other, and that shall be effective to maintain the two casings in their closed position relatively to each other while the device is being carried.

In practicing my invention, I provide a plurality of superposed casings having baking surfaces associated therewith which are heated by electric-heating elements located in the respective casings. Suitable supporting members for the combined casings are provided, as well as means for conducting current from one casing to the other.

I provide carrying handles pivotally mounted at each end of the lower casing and operatively connected to link members through which, by a suitable turning movement of either or both of the carrying members, the upper casing may be given a turning movement relatively to the lower casing. The carrying handles are located in an offset position relatively to the longitudinal center line of the casings to insure that the upper casing shall remain in its closed position relatively to the lower casing while the device is being carried.

In the single sheet of drawings.

Figure 1:
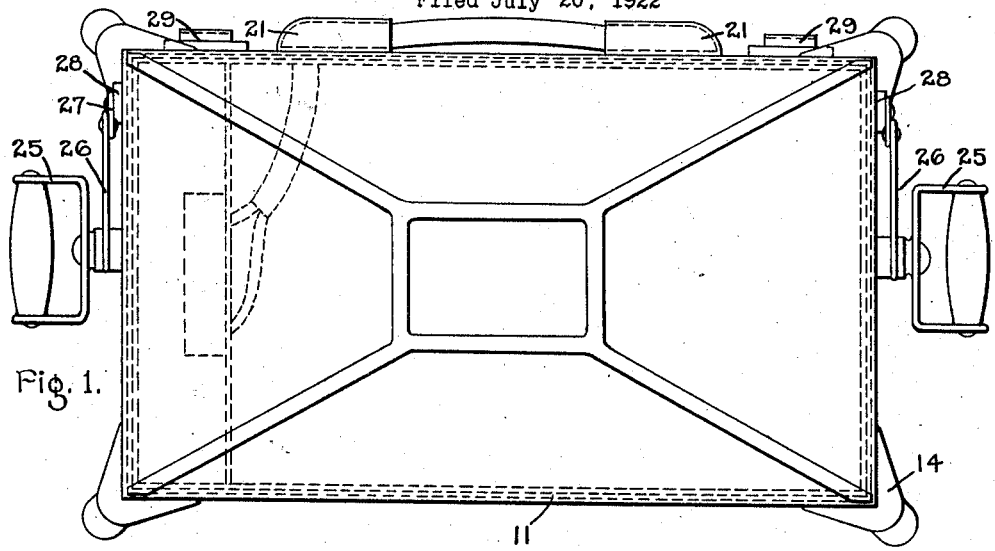
Figure 1 is a top plan view of an electrically-heated waffle iron embodying my invention.
Figure 2:
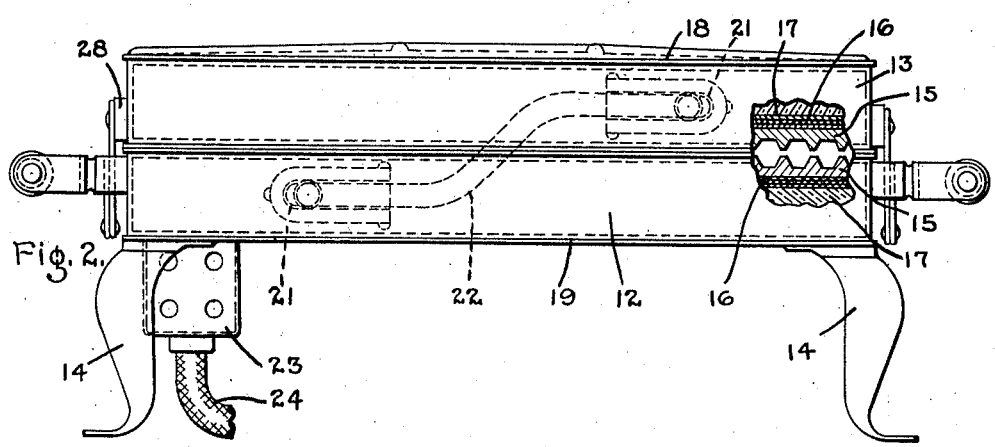
Fig. 2 is a view, in side elevation, of a device embodying my invention.

An electrically-heated waffle iron, designated generally by the numeral 11, comprises a lower open metallic casing 12 and an upper substantially similar casing 13, which may be of any suitable or desired contour, but are here shown as substantially rectangular in contour. Suitable supporting members 14 are removably associated with the lower casing. Baking surfaces 15, having any suitable or desired outer configuration usually employed in waffle irons, and located in the open side of each casing and are heated by electric-heating elements 16 of any suitable or desired construction, located closely adjacent to the inner surface of the members 15. A quantity 17 of a suitable heat-insulating material, such as mineral wool, may be located between the heating elements 16, and the upper wall 18 of the upper casing and the lower wall 19 of the lower casing.

Hollow socket members 21 are secured against the rear wall of each of the casings 12 and 13 and receive the ends of a flexible armored conduit 22, within which are located suitable electric-circuit conductors to permit of electrically connecting the heating elements 16 in the upper and lower casings. A terminal box 23 is suitably secured to the bottom wall 19 of the lower casing and receives the end of a supply-circuit conductor 24, only a portion of which is illustrated in the drawing.

Means for carrying the waffle iron and for varying the angular position of the upper casing relatively to the lower casing, comprise a pair of spade handles 25, which are so secured against the end walls of the lower casing 12 as to permit of their having a turning movement relatively thereto. A lever arm 26 is suitably secured, at one of its ends, to the stem of the spade handle 25, and at its other end, is pivotally connected to a link member 27. The other end of the link member 27 is pivotally secured to a lug 28 which is secured to the upper casing 13 near the rear edge thereof. The spade handle 25 is not mounted on the longitudinal center line of the casings but is mounted closer to the rear edge of the casing than to the front edge.

The two casings are pivotally secured to each other at the rear sides by a plurality of suitable hinge members 29.

Figure 3:
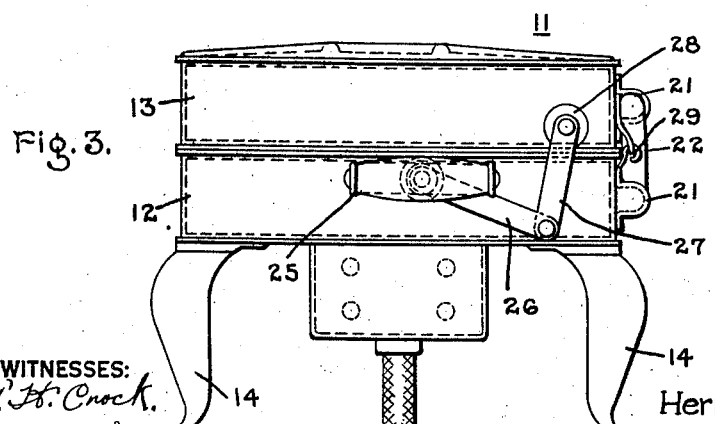
Fig. 3 is a view, in end elevation, thereof.

If it be assumed that the device is in the position illustrated in the drawing and it is desired to open the upper casing, the handle members 25 may be given a turning movement in such direction that the outer end of the lever 26, which is pivotally connected to the link member 27, is caused to move in an upwardly direction. The upper casing is then moved upwardly an amount that is in accordance with the turning movement of the handle members 25. If it is desired to cause the upper casing to again take its normal position, the handle members 25 are moved in the opposite direction whereby the upper casing is caused to resume the position substantially as shown in Fig. 3 of the drawings.

When it is desired to carry the waffle iron, the two spade handles 25 permit of doing this and, as the forward portion of the waffle iron tends to move in a downwardly direction, the levers 26 tend to also move in a downwardly direction relatively to the waffle iron, thereby tending to maintain the two casings in their closed positions relatively to each other while the assembled device is being carried.

Various modifications in my invention may be made without departing from the spirit and scope thereof, and I desire, therefore, to be limited only by the scope of the appended claims.

I claim as my invention:—

1. In an electric-cooking device, in combination, an electrically-heated lower casing, an electrically-heated superposed casing hinged on said lower casing, and having a closed and an open position relatively thereto, and a combined carrying and upper-casing-raising means pivotally mounted on the lower casing in such position as to cause said upper casing to remain in its closed position while the device is being carried by said combined means.

2. In an electric cooking device, the combination with a lower and an upper electrically-heated casing hingedly connected together, of a pair of handles directly pivotally mounted on the lower casing, and a plurality of link members secured to said handles and to said upper casing and effective to vary the angular position of the two casings relatively to each other.

3. In an electric cooking device, the combination with a lower and an upper electrically-heated casing hingedly connected together, of a pair of handles directly pivotally mounted on the lower casing, levers having one end fixedly secured to the respective handles, and link members having their ends pivotally connected to the other end of the levers and to the upper casing and effective to vary the position of the upper casing relatively to the lower casing in accordance with a turning movement of said handles.

4. In an electric cooking device, the combination with a lower and an upper electrically-heated casing hingedly connected together, of a pair of handles directly pivotally mounted on the lower casing, and a plurality of link members secured to said handles and to said upper casing and effective to vary the angular position of the two casings relatively to each other, said handles being so located on said lower casing as to cause the upper casing to remain in a closed position relatively to the lower casing while the device is being carried by said handles.

In testimony whereof, I have hereunto subscribed my name this 6th day of July 1922.

HERMAN M. BIEBEL.